United States Patent
Hwang et al.

(10) Patent No.: US 8,194,793 B2
(45) Date of Patent: Jun. 5, 2012

(54) MULTI-STAGE FREQUENCY OFFSET ESTIMATION AND COMPENSATION METHOD AND ITS CIRCUIT

(75) Inventors: Syang-Myau Hwang, Cupertino, CA (US); Chun Chin Chen, Taoyuan (TW)

(73) Assignee: Uniband Electronic Corp., Hsinchu (TW)

( * ) Notice: Subject to any disclaimer, the term of this patent is extended or adjusted under 35 U.S.C. 154(b) by 209 days.

(21) Appl. No.: 12/697,612

(22) Filed: Feb. 1, 2010

(65) Prior Publication Data

US 2011/0080978 A1    Apr. 7, 2011

(30) Foreign Application Priority Data

Oct. 6, 2009  (TW) .............................. 98133853 A (51) Int. Cl.
- *H03D 3/22* (2006.01)
- *H04L 27/22* (2006.01)
- *H04L 27/18* (2006.01)
- *H03D 3/00* (2006.01)
- *H03K 9/06* (2006.01)

(52) U.S. Cl. .................. 375/329; 375/322; 375/279
(58) Field of Classification Search .................. 375/229, 375/293
See application file for complete search history.

(56) References Cited

U.S. PATENT DOCUMENTS

| | | | |
|---|---|---|---|
| 2009/0290664 A1* | 11/2009 | Walton et al. | 375/344 |
| 2010/0128661 A1* | 5/2010 | Becker et al. | 370/316 |
| 2010/0182979 A1* | 7/2010 | Malladi et al. | 370/336 |
| 2010/0195563 A1* | 8/2010 | Jong et al. | 370/321 |
| 2011/0110445 A1* | 5/2011 | Sameer et al. | 375/260 |

* cited by examiner

*Primary Examiner* — David C. Payne
*Assistant Examiner* — Erin File
(74) *Attorney, Agent, or Firm* — Muncy, Geissler, Olds & Lowe, PLLC (57) ABSTRACT

A multi-stage frequency offset (FO) estimation and compensation method and its circuit are described. The method includes performing at least a stage of primary-level FO estimation and compensation procedure, and a stage of advance-level FO estimation and compensation procedure. The first stage receives an input carrier signal of a larger FO and outputs a corrected carrier signal with an estimation error within the required estimation range of the next stage, to the next stage. Generated and fed forward stage-by-stage, the corrected carrier signal free of FO may be approached. Besides, since a feed-forward rather than a closed-loop approach is employed, the SNR requirement may be lower. Also, at primary-level, modulation may be first removed so the whole input carrier signal may be used to estimate FO; at advance-level, the periodic PN sequence in the input carrier signal may be utilized to estimate FO, thereby no dedicated training symbols are required.

17 Claims, 10 Drawing Sheets

MULTI-STAGE FREQUENCY OFFSET ESTIMATION AND COMPENSATION METHOD AND ITS CIRCUIT

BACKGROUND OF THE INVENTION

1. Field of the Invention

The present invention is related to a frequency offset estimation and compensation method and its circuit, and more particularly to a feed-forward multi-stage frequency offset estimation and compensation method and its circuit.

2. Description of the Prior Art

Conventionally, the frequency offset issue of wireless communication has been addressed by techniques such as Automatic Frequency Control (AFC) and Phase Lock Loop (PLL). However, such techniques, due to its closed-loop configuration, can only correct frequency offset of a smaller range, and require high signal-to-noise ratio (SNR) and long training symbols for the loop to converge and to meet the requirements of the wireless communication standard.

Therefore, the present invention provides a multi-stage frequency offset estimation and compensation method which may correct a larger range of frequency offset, and allow a short burst carrier signal (short training symbols) of lower SNR.

SUMMARY OF THE INVENTION

The present invention is directed to a multi-stage frequency offset (FO) estimation and compensation method and its circuit, which may correct a larger range of FO, and allow a short burst carrier signal of lower SNR.

The present invention provides a multi-stage FO estimation and compensation method and its circuit, which corrects an input carrier signal with a larger range of FO by applying multiple stages of FO estimation and compensation.

The present invention provides a multi-stage FO estimation and compensation method and its circuit, which lowers the SNR requirement of the carrier signal by adopting an approach which generates and forward feeds a corrected carrier signal stage by stage to approach the corrected carrier signal free of FO The present invention provides a multi-stage FO estimation and compensation method and its circuit, which may remove the phase modulation of the input carrier signal for primary-level frequency offset estimation, and then uses the periodic pseudo noise (PN) sequence for advance-level FO estimation so that no dedicated training symbols are required, thereby maintaining the input carrier signal to be short burst.

The present invention discloses a multi-stage FO estimation and compensation method including providing a binary phase shift keying modulated input carrier signal which includes a periodic PN sequence of more than one period of length; performing at least one time a primary-level FO estimation and compensation procedure; and performing one time an advance-level FO estimation and compensation procedure; wherein each time is a stage.

According to an embodiment, the first stage can be set to correct an input carrier signal with a larger range of FO; then a corrected carrier signal of the first stage is fed forward to the next stage so that its frequency offset estimation error becomes the required estimation range of the FO for the next stage. When the corrected carrier signal is generated and fed forward stage by stage, the required estimation range is also reduced with stage, so that the corrected carrier signal free of FO is eventually approached, and in comparison with the loop converging mechanism, the multi-stage forward feeding mechanism lowers the SNR requirement of the input carrier signal.

Also, according to an embodiment, when performing the primary-level FO estimation and compensation procedure, the phase modulation may be removed in advance so that the whole input carrier signal may be used for FO estimation. Alternatively, according to another embodiment, an input carrier signal containing an unmodulated portion may be used directly to estimate FO at primary-level. Then, according to an embodiment, the advance-level FO estimation and compensation procedure is performed where a periodic PN sequence with more than one period of length contained in the input carrier signal is used as the training symbols so that no dedicated training symbols are required for FO estimation, thereby tailoring the method for short burst input carrier signal.

A multi-stage FO estimation and compensation circuit according to an embodiment of the present invention includes at least an FO estimation circuit and at least an FO compensation circuit, so as to estimate the FO of a stage and compensate the frequency of the input carrier signal for the estimated FO.

A multi-stage FO estimation and compensation circuit according to an embodiment of the present invention includes an FO estimation circuit and an FO compensation circuit for performing including the advance-level FO estimation and compensation procedure, and a preprocessor circuit for providing the input carrier signal respectively adapted for the FO estimation circuit and the FO compensation circuit.

The frequency offset estimation circuit inputs the input carrier signal of the current stage according to the order of the time index, and outputs an estimated frequency offset. The multi-stage frequency offset estimation and compensation circuit includes: a delay buffer inputting the input carrier signal of the current time index and outputting the input carrier signal delayed by a time index delay $D(i)$ as the delayed input carrier signal, wherein i is the current stage number; a complex conjugate calculator inputting the delayed input carrier signal and outputting the complex conjugate of the delayed input carrier signal; a multiplier calculating the product of the input carrier signal of the current time index and the complex conjugate of the delayed input carrier signal; an accumulator accumulating a number, equal to the number of samples of the current stage, of the products to obtain an accumulated sum; a phase calculator calculating the tangent of the accumulated sum to obtain an averaged phase difference, and then dividing the averaged phase difference by $2\pi \cdot T_S$ to obtain a quotient, wherein $T_S$ is a sampling period of the input carrier signal; a divider, further dividing the quotient by $\alpha(i) \cdot D(i)$ to obtain the estimated frequency offset, wherein $\alpha(i)$ is a square adjustment coefficient of the current stage.

The frequency offset compensation circuit inputs the input carrier signal of the current stage and the estimated frequency offset and outputs the corrected carrier signal of the current stage.

The objective, technologies, features and advantages of the present invention will become apparent from the following description in conjunction with the accompanying drawings wherein are set forth, by way of illustration and example, certain embodiments of the present invention.

DESCRIPTION OF THE PREFERRED EMBODIMENT

The relative motion between a transmitter and a receiver of wireless communication causes frequency discrepancy between the carrier signal transmitted by the transmitter and that received by the receiver. Such discrepancy is referred to as frequency offset (FO). As a result, before a carrier signal can be demodulated on the receiver, the FO of the carrier signal needs to be compensated for.

The range of the FO that a wireless receiver can take care of is often constrained. The present invention provides a multi-stage FO estimation and compensation method and its circuit which may handle a larger range of FO.

The signal-to-noise ratio (SNR) of the input carrier signal is also constrained, especially for the conventional loop-converging mechanism. When the SNR is too low, the receiver would not be able to differentiate between the carrier signal and the noise and hence is unable to demodulate the carrier signal. The present invention provides a multi-stage FO estimation and compensation method and its circuit which generates and forward feeds a corrected carrier signal stage by stage so that the corrected carrier signal free of frequency offset is approached, and in comparison with the loop-converging mechanism, the multi-stage forward feeding mechanism lowers the SNR requirement of the input carrier signal.

In order to establish communication between the wireless transmitter and receiver, the input carrier signal to the receiver needs to contain training symbols. Frequently, the required training symbols are long and hence the communication efficiency is low. The present invention provides a multi-stage frequency offset and compensation method and its circuit, which may remove the phase modulation of the input carrier signal for a primary-level FO estimation, and then utilizes the periodic pseudo-noise (PN) sequence contained in the input carrier signal for an advance-level FO estimation so that no dedicated training symbols are required, and the communication efficiency is improved.

Figure 1:
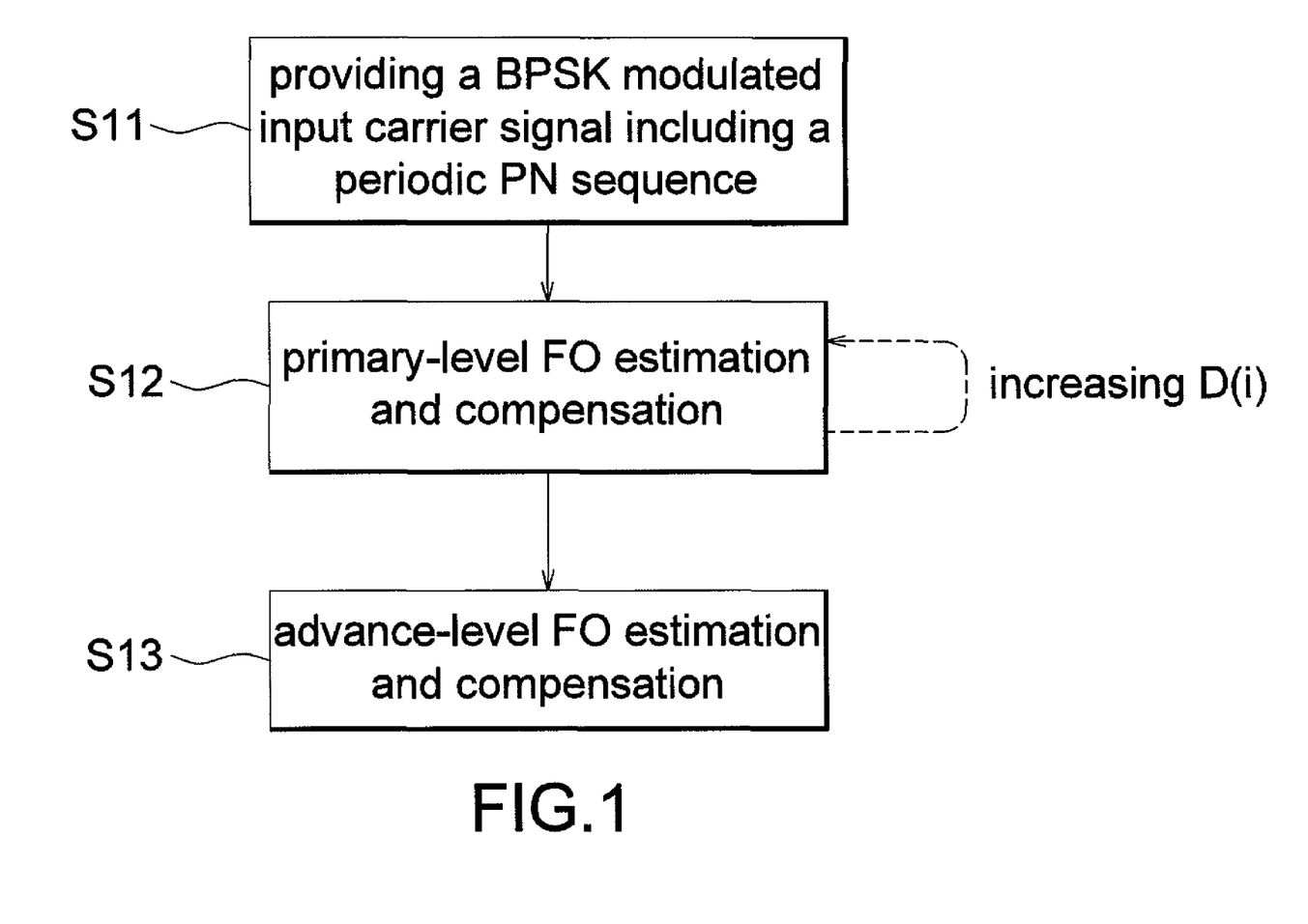
FIG. 1 is a flow chart illustrating a multi-stage frequency offset estimation and compensation method according to an embodiment of the present invention.

FIG. 1 is a flow chart of a multi-stage FO estimation and compensation method according to an embodiment of the present invention. A multi-stage FO estimation and compensation method according to an embodiment in reference to FIG. 1 includes:

providing a binary phase shift keying (BPSK) modulated carrier signal, which includes a periodic PN sequence of more than one period of length (step S11);

performing at least one time a primary-level FO estimation and compensation procedure (step S12); and performing one time an advance-level FO estimation and compensation procedure (step S13); wherein each time is a stage.

Wireless communication may use the phase of a carrier signal to carry a data signal. The transmitter first quantizes the data signal into a data sequence upon required, and transforms the data sequence into a phase sequence. Then the transmitter modulates a carrier signal by incorporating the phase sequence into the phase of the carrier signal and the transmitter transmits the carrier signal. The receiver receives the carrier signal, analyzes the carrier signal to recover the phase sequence, and transforms the phase sequence back into the data sequence. In particular, the mechanism which uses a positive phase (0) and a negative phase ($\pi$) to carry data is called binary phase shift keying (BPSK) modulation.

Figure 2:
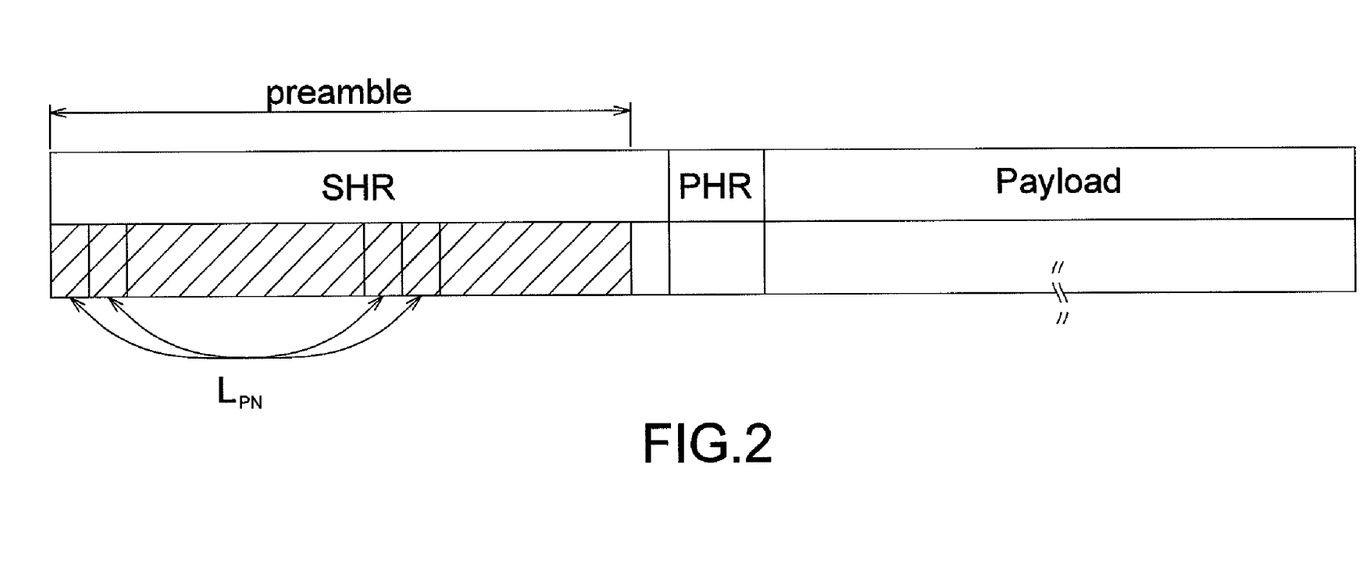
FIG. 2 is a diagram illustrating a physical layer (PHY) package of a spread spectrum carrier signal.

FIG. 2 is a diagram illustrating a physical layer (PHY) package of a carrier signal. As shown in FIG. 2, a PHY package of a spread spectrum carrier signal for wireless communication typically includes a synchronization header (SHR), a PHY header (PHR), and a payload, wherein the SHR includes a periodic PN sequence, called a preamble. After the receiver receives an input carrier signal, the receiver analyzes the SHR where the preamble is used to establish communication with the transmitter and to despread the input carrier signal; the PHR contains information required for the demodulation procedure that follows; and the payload contains the data sequence.

Generally, the input carrier signal r(0;k) to a receiver can be expressed as expression (1).

$$r(0;k) = \exp(j \cdot (2\pi \cdot \Delta f \cdot k \cdot T_S + \theta + d(k))) + n(k) \quad (1)$$

wherein $\Delta f$ is an FO; $T_S$ is a preset sampling period; k is the time index; $\theta$ is a phase shift of the input carrier signal; d(k) is the phase modulation and may be 0 or $\pi$ for BPSK modulation; and n(k) is the noise. According to an embodiment, the carrier frequency is known, and may thus be removed prior to the estimation of FO; or according to another embodiment, the carrier frequency is unknown, and may be removed together with the FO during compensation for FO. Therefore, the carrier frequency is irrelevant to the estimation of FO and has not appeared in expression (1).

Figure 3:
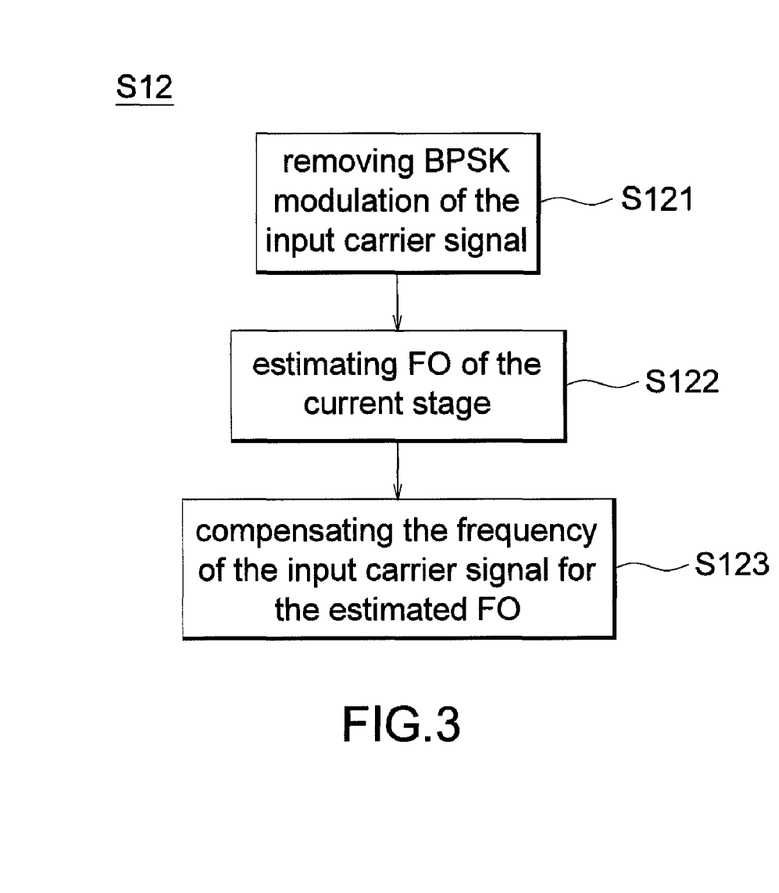
FIG. 3 is a flow chart illustrating step S12 in FIG. 1 according to an embodiment of the present invention.

FIG. 3 is a flow chart illustrating the primary-level FO estimation and compensation procedure according to an embodiment of the present invention. The primary-level FO estimation and compensation procedure (S12) according to the embodiment in reference to FIG. 3 includes:

removing the BPSK modulation of the input carrier signal to provide the unmodulated input carrier signal (step S121);

estimating the FO with the unmodulated input carrier signal (step S122); and compensating the frequency of the input carrier signal of the current stage for the estimated FO so as to obtain the corrected carrier signal of the current stage (step S123).

According to an embodiment, the primary-level FO estimation and compensation procedure is performed more than once, denoted by the self-referred arrow of the step S12 in FIG. 1, wherein each time is called a stage and hence the name multi-stage FO estimation and compensation. The input carrier signal of the first stage is the provided input carrier signal from step S11, and the input carrier signal beyond the first stage is the forward fed corrected carrier signal of the previous stage. When the multi-stage FO estimation and compensation procedure advances a stage, the FO estimation range is reduced. With the corrected carrier signal generated and forward fed stage by stage, a large range of FO may be reduced to be within a predetermined advance-level FO estimation range. In comparison with the loop-converging mechanism, the multi-stage forward feeding mechanism lowers the SNR requirement of the input carrier signal.

According to expression (1), the phase of the input carrier signal includes the FO $\Delta f$, the phase shift $\theta$, the phase modulation d(k), and the noise n(k). Therefore, the phase shift $\theta$, the BPSK phase modulation d(k) and the noise n(k) need to be first removed before estimating the FO.

Accordingly, the primary-level FO estimation and compensation procedure (step S12) removes the phase modulation d(k) (S121) prior to estimating the FO Δf according to an embodiment. In such way, no specific training symbols are required as the whole PHY layer package may be used to estimate the FO. Particularly, For the present embodiment, the BPSK phase modulation may be removed by squaring the input carrier signal as shown below.

The input carrier signal of the current stage r(i−1;k) is expressed as expression (2)

$$r(i-1;k)=\exp(j\cdot(2\pi\cdot\Delta f(i)\cdot k\cdot T_S+\theta+d(k)))+n(k) \quad (2)$$

wherein i is a positive integer indicating the current stage number, and Δf(i) is the FO of the current stage. Since the BPSK phase modulation is either 0 or π, when the input carrier signal r(i−1;k) is squared, the phase modulation of the squared input carrier signal r(i−1;k)² becomes either 0 or π, and is therefore removed, as shown in expression (3). The resulting input carrier signal is referred to as the unmodulated input carrier signal of the current stage r'(i−1;k).

$$r'(i-1;k) = r(i-1;k)^2 \quad (3)$$
$$= \exp(j\cdot(\alpha(i)\cdot 2\pi\cdot\Delta f(i)\cdot k\cdot T_S + 2\theta + 2d(k))) + n'(k)$$
$$= \exp(j\cdot(\alpha(i)\cdot 2\pi\cdot\Delta f(i)\cdot k\cdot T_S + 2\theta)) + n'(k)$$

wherein α(i) is the square adjustment coefficient of the current stage and is equal to 2 as the phase modulation is removed by squaring; and n'(k) is the amplified noise from squaring.

According to a different embodiment, an input carrier signal containing an unmodulated portion r'(0;k) may be provided in step S11, so that the unmodulated portion would be used as the training symbols, and the step of removing the phase modulation (S121) would be no longer required, and the square adjustment coefficient of the current stage α(i) is therefore 1.

Next, the step of estimating the FO of the current stage (S122) according to an embodiment is detailed below:

removing phase shift θ:

The unmodulated input carrier signal is delayed and the complex conjugate of the delayed unmodulated input carrier signal is obtained, denoted as (r'(i−1;k−D(i)))*. Then the product of the unmodulated input carrier signal r'(i−1;k) and the complex conjugate of the delayed unmodulated input carrier signal (r'(i−1;k−Di)))* is calculated to remove the phase shift θ, as shown in expression (4) below.

$$r'(i-1;k)\cdot(r'(i-1;k-D(i)))^* = \exp(j\cdot(\alpha(i)\cdot 2\pi\cdot\Delta f(i)\cdot k\cdot T_S + 2\theta))\cdot$$
$$\exp(-j\cdot(\alpha(i)\cdot 2\pi\cdot\Delta f(i)\cdot(k-D(i))\cdot T_S + 2\theta)) + n''(k) =$$
$$\exp(j\cdot(\alpha(i)\cdot 2\pi\cdot\Delta f(i)\cdot D(i)\cdot T_S)) + n''(k)$$

wherein D(i) is the time index delay of the current stage, and n''(k) is the noise.

removing noise n''(k):

The product of the unmodulated input carrier signal r'(i−1;k) and the complex conjugate of the delayed unmodulated input carrier signal (r'(i−1;k−Di)))* is accumulated to obtain an accumulated sum, whereby noises n''(k) are cancelled out with each other, as shown in expression (5).

$$\sum_{k=1}^{N(i)} r'(i-1;k)\cdot(r'(i-1;k-D(i)))^* = \quad (5)$$
$$N(i)\cdot\exp(j\cdot(\alpha(i)\cdot 2\pi\cdot\Delta f(i)\cdot D(i)\cdot T_S))$$

wherein N(i) is the number of samples of the current stage.

calculating FO Δf(i):

The tangent of the accumulated sum is calculated to obtain an average phase difference, which, after being divided by the square adjustment coefficient α(i), 2π and the time delay D(i)·T_S, becomes the FO of the current stage Δf(i) as shown in expression (6).

$$\Delta f(i) = \quad (6)$$
$$\frac{1}{\alpha(i)\cdot 2\pi\cdot D(i)\cdot T_S}\tan^{-1}\left(\frac{1}{N(i)}\sum_{k=1}^{N(i)} r'(i-1;k)\cdot(r'(i-1;k-D(i)))^*\right)$$

wherein the factor 1/N(i) may be omitted without affecting N(i) the result, and thereby expression (6) is equivalent to expression (7) shown below.

$$\Delta f(i) = \frac{1}{\alpha(i)\cdot 2\pi\cdot D(i)\cdot T_S}\tan^{-1}\left(\sum_{k=1}^{N(i)} r'(i-1;k)\cdot(r'(i-1;k-D(i)))^*\right) \quad (7)$$

The FO estimation range of expression (7) is determined by the square adjustment coefficient α(i) and the time index delay D(i), as shown by expression (8).

$$FO\text{ estimation range} = \pm\frac{1}{\alpha(i)\cdot D(i)\cdot T_S} \quad (8)$$

wherein the square adjustment coefficient of the current stage is equal to 2 as the input carrier signal has been squared for removing modulation (S121); consequently, the FO estimation range is reduced by half.

According to an embodiment, the time index delay of the current stage D(i) is adjusted so that the FO estimation range may cover the required estimation range of the current stage RR(i). The time index delay D(i) is adjusted to be within the range shown in expression (9).

$$1 \leq D(i) < \frac{1}{\alpha(i)\cdot T_S \cdot RR(i)} \quad (9)$$

wherein D(i) is a positive integer. Based on D(i), the number of samples of the current stage N(i) is selected from the range shown in expression (10).

$$1 \leq N(i) = N_{TOTAL} - D(i) \quad (10)$$

wherein $N_{TOTAL}$ is the total number of samples in a PHY package. The total number of samples $N_{TOTAL}$ is a positive integer, and is determined by the sampling period $T_S$.

The estimation of FO usually contains errors and therefore, the estimated FO of the current stage should include FO estimation error err(i), as shown in expression (11).

$$\Delta f'(i)=\Delta f(i)\pm\text{err}(i) \qquad (11)$$

According to an embodiment, the FO estimation error of the current stage err(i) is also covered by the FO estimation range of the current stage. Being a function of the time index delay D(i) and the number of samples N(i), the FO estimation error of the current stage err(i;D(i);N(i)) can be adjusted by adjusting D(i) and N(i), as shown in expression(12).

$$\text{err}(i; D(i); N(i)) \leq \frac{1}{\alpha(i)\cdot D(i)\cdot T_S} RR(i) \qquad (12)$$

The FO estimation error err(i;D(i);N(i)) may be calculated in general by expression (13) shown below, wherein the time index delay D(i) and the number of samples N(i) may be adjusted to satisfy the expression(12).

$$\text{err}(i; D(i); N(i)) = \frac{1}{D(i)^2}\left(\frac{D(i)}{L_{UW}^2}\cdot\frac{1}{SNR(N(i))} + \frac{1}{L_{UW}}\cdot\frac{1}{2\cdot SNR(N(i))^2}\right) \qquad (13)$$

wherein $L_{UW}$ is the unique word length of the input carrier signal r(i−1;k); SNR(N(i)) is the signal-to-noise ratio of the input carrier signal with the effect of squaring and averaging (or accumulating) accounted for. As shown by expression (13), when the time index delay D(i) increases, the estimation error err(i;D(i);N(i)) decreases. Also, when the number of samples N(i) increases, the cancellation effect of the noise n"(k) from carrying out expression (5) may be improved, whereby the SNR(N(i)) in expression (13) is increased, which causes the estimation error err(i;D(i);N(i)) to decrease.

Next, the details of the step of compensating the frequency of the input carrier signal of the current stage for the estimated FO so as to obtain the corrected carrier signal of the current stage (S123) according to an embodiment are provided below.

The corrected carrier signal r(i;k) is obtained by subtracting the estimated FO Δf'(i) from the frequency of the input carrier signal of the current stage r(i−1;k), as shown in expression (14).

$$r(i;k)=r(i-1;k)\cdot\exp(j\cdot 2\pi\cdot(-\Delta f'(i))\cdot k\cdot T_S) \qquad (14)$$

In light of expression (8), in order for the FO estimation range of the first stage to cover a larger range of FO, D(1) should be a small value. However, from expression (13), err(1) increases as a consequence. Therefore, according to an embodiment, when err(1) is outside the predetermined advance-level FO estimation range, the primary-level FO estimation and compensation procedure (S12) is performed a multiple times wherein each time is a stage. When the current stage is the first stage (1=1), the input carrier signal of the current stage r(i−1;k) is the provided input carrier signal r(0;k), and the required estimation range RR(i) of the current stage can be but not limited to the maximum allowable FO of the wireless communication protocol such as IEEE 802.15.4. Then the FO Δf'(1) of the input carrier signal of the current stage r(0;k) is estimated and is being compensated for so that the corrected carrier signal of the current stage r(1;k) is obtained. When the current stage is beyond the first stage (i>1), such as when i=2, the input carrier signal of the current stage r(i−1;k) is the corrected carrier signal of the previous stage r(1;k) fed forward and so on. The corrected carrier signal r(i;k) of any stage can be generalized as expression (14) shown above Expression (14) may be expanded into expression (15) assuming Δf'(i)=Δf(i)−err(i).

$$\begin{aligned}
r(1;k) &= r(0;k)\cdot\exp(j\cdot 2\pi\cdot(-\Delta f'(1))\cdot k\cdot T_S) \\
&= r(0;k)\cdot\exp(-j\cdot 2\pi\cdot(\Delta f(1) - \text{err}(1))\cdot k\cdot T_S) \\
r(2;k) &= r(1;k)\cdot\exp(j\cdot 2\pi\cdot(-\Delta f'(2))\cdot k\cdot T_S) \\
&= r(0;k)\cdot\exp(-j\cdot 2\pi\cdot(\Delta f(1) - \text{err}(1) + \\
&\quad \Delta f(2) - \text{err}(2))\cdot k\cdot T_S) \\
&= r(0;k)\cdot\exp(-j\cdot 2\pi\cdot(\Delta f(1) - \text{err}(2))\cdot k\cdot T_S) \\
&\vdots \\
r(i;k) &= r(i-1;k)\cdot\exp(j\cdot 2\pi\cdot(-\Delta f'(i))\cdot k\cdot T_S) \\
&= r(0;k)\cdot\exp(-j\cdot 2\pi\cdot(\Delta f(1) - \text{err}(1) \ldots + \\
&\quad \Delta f(i) - \text{err}(i))\cdot k\cdot T_S) \\
&= r(0;k)\cdot\exp(-j\cdot 2\pi\cdot(\Delta f(1) - \text{err}(i))\cdot k\cdot T_S)
\end{aligned}$$

When the FO of any stage Δf(i) is estimated in step S122, an FO estimation error err(i) may be generated. Therefore, when the current stage is beyond the first stage (i>1), the FO estimation error err(i−1) of the previous stage is set to be the required estimation range of the current stage RR(i), so that it may be covered by the FO estimation range of the current stage, the range which can be calculated by expression (8). For example, err(1) is covered by Δf(2) in expression (15).

Under the condition that the FO estimation range covers the required estimation range RR(i) (so that expression (9) is satisfied), the time index delay D(i) is increased with stage to reduce the FO estimation error according to expression (13), and therefore the FO estimation error is reduced with stage as shown by expression (16).

$$\text{err}(1;D(1);N(1))<\text{err}(2;D(2);N(2))\ldots<\text{err}(i;D(i);N(i)) \qquad (16)$$

Eventually, err(i;D(i);N(i)) may be covered by the advance-level FO estimation range so as to enter the step of the advance-level FO estimation and compensation (S13). Also reducing the FO estimation error by generating and forward feeding the corrected carrier signal stage by stage lowers the SNR requirement of the input carrier signal.

Figure 4:
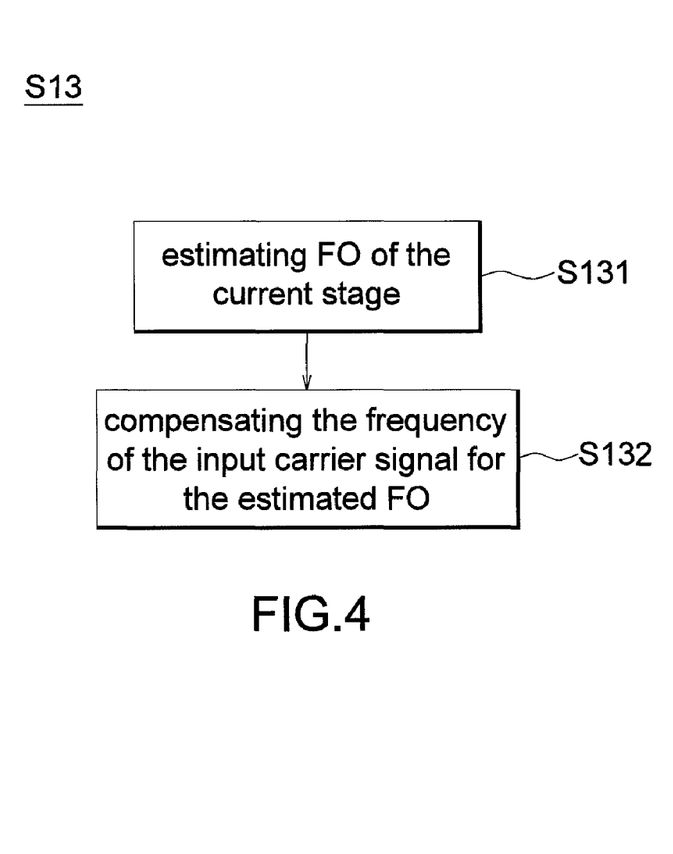
FIG. 4 is a flow chart illustrating step S13 in FIG. 1 according to an embodiment of the present invention.

FIG. 4 is a flow chart of the advance-level FO estimation and compensation procedure according to an embodiment. The advance-level FO estimation and compensation procedure (S13) according to an embodiment in reference to FIG. 4 includes:

estimating the FO with the periodically repeated chips of the periodic PN sequence (S131); and compensating the frequency of the input carrier signal of the current stage for the estimated FO so as to obtain the corrected carrier signal of the current stage (S132).

The step of estimating the FO (S131) is similar to the step S122. The differences are discussed below:

The advance-level FO estimation and compensation procedure does not contain a step for removing the phase modulation, and instead, the periodically repeated chips of the periodic PN sequence contained in the input carrier signal are used for the step of removing the phase shift θ during estimating the FO (S122). As a result, the time index delay of the current stage D(i) is set according to equation (17).

$$D(i)=m\cdot L_{PN} \qquad (17)$$

wherein m is the reciprocal of the sampling period $T_S$ divided by the chip rate, and $L_{PN}$ is the period (the length of a period of chips) of the periodic PN sequence. The number of samples N(i) is selected from the range defined from the time index delay D(i), as shown by expression (18).

$$1 \leq N(i) \leq N_{PN} - D(i) \quad (18)$$

wherein $N_{PN}$ is the total number of samples of the periodic PN sequence, which is a positive integer determined by the sampling period $T_S$. Since the periodic PN sequence is present in the input carrier signal for the purpose of despreading, no dedicated training symbols are required to carry out the advance-level FO estimation and compensation procedure.

Also, since the advance-level FO estimation and compensation procedure does not require the step of squaring the input carrier signal to remove the phase modulation, the square adjustment coefficient of the current stage $\alpha(i)$ in equation (7) is equal to 1. As a result, the advance-level FO estimation range, which is governed by the same expression (8), has not been reduced by half due to squaring. Therefore, the number of stages required to reduce the FO estimation error so as to be covered by the advance-level FO estimation range is less.

Moreover, since the advance-level FO estimation and compensation procedure does not require the step of squaring the input carrier signal to remove the phase modulation, the noise would not be amplified because of squaring. Hence the FO estimation error of the output corrected carrier signal is reduced.

FIG. 5 to FIG. 11 are block diagrams illustrating different embodiments of the multi-stage FO estimation and compensation circuit of the present invention. In the following, the embodiments of the multi-stage FO estimation and compensation circuit that implement the above-mentioned method in reference to FIG. 1, FIG. 3 and FIG. 4, would be discussed in reference to FIG. 5 to FIG. 10. The multi-stage FO estimation and compensation circuit includes: an FO estimation circuit 1310, an FO compensation circuit 1320 and a preprocessor circuit (unindicated). The FO estimation circuit 1310 inputs an input carrier signal and outputs an estimated FO. The FO compensation circuit 1320 inputs the input carrier signal and the estimated FO, and outputs a corrected carrier signal. The preprocessor circuit provides the input carrier signal respectively adapted for the FO estimation circuit 1310 and the FO compensation circuit 1320. The FO estimation circuit 1310 and the FO compensation circuit 1320 perform including the step of estimating the FO of the current stage (S131) and the step of compensating the frequency of the input carrier signal for the estimated FO (S132) in the advance-level FO estimation and compensation procedure, respectively.

Figure 5:
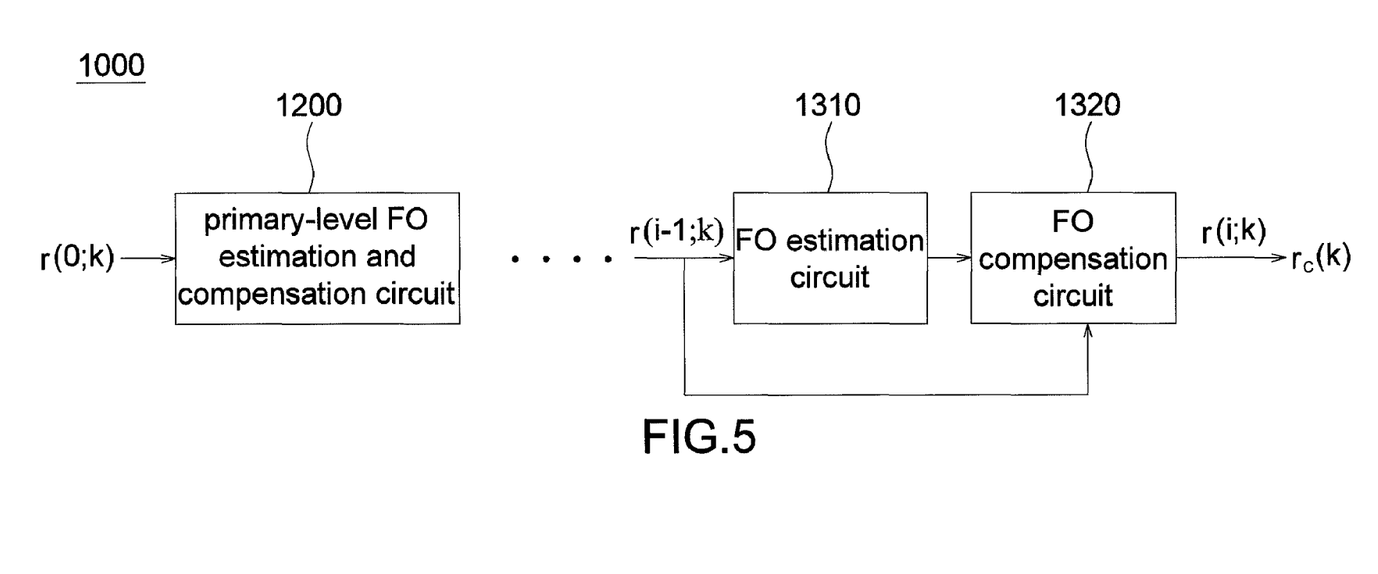
FIG. 5 is a block diagram illustrating a multi-stage frequency offset estimation and compensation circuit according to an embodiment of the present invention.

The multi-stage FO estimation and compensation circuit 1000 according to an embodiment in reference to FIG. 5 inputs an input carrier signal r(0;k) and outputs a corrected carrier signal $r_C(k)$. The preprocessor circuit includes at least a primary-level FO estimation and compensation circuit 1200 connected in series with the FO estimation circuit 1310 and the FO compensation circuit 1320, wherein each primary-level FO estimation and compensation circuit 1200 performs the primary-level FO estimation and compensation procedure for a stage respectively.

Figure 6:
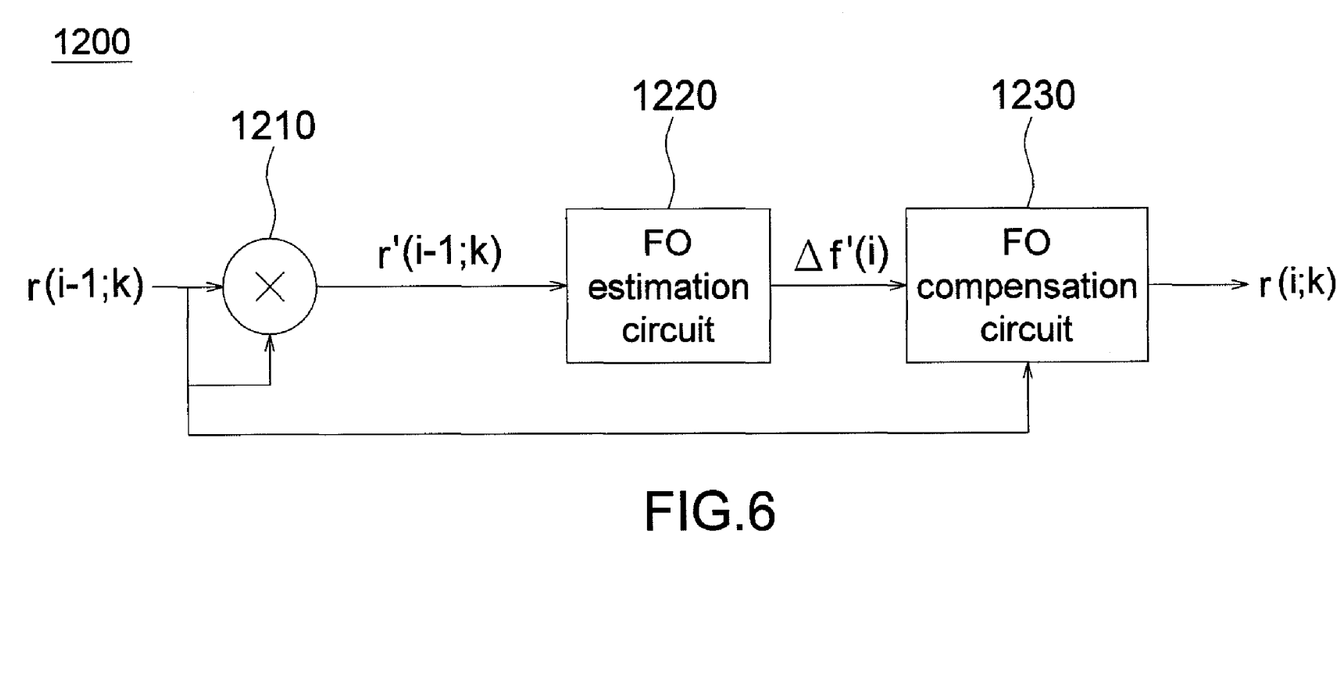
FIG. 6 is a block diagram illustrating a primary-level frequency offset estimation and compensation circuit according to an embodiment of the present invention.

The primary-level FO estimation and compensation circuit according to an embodiment in reference to FIG. 6 performs the primary-level FO estimation and compensation procedure (S12). The primary-level FO estimation and compensation circuit 1200 inputs the input carrier signal of the current stage r(i−1;k) according to the order of the time index, and outputs the corrected carrier signal of the current stage, and it includes a squaring circuit 1210, an FO estimation circuit 1220, and an FO compensation circuit 1230. The squaring circuit 1210 inputs the input carrier signal of the current stage r(i−1;k), performs the step of removing the BPSK phase modulation of the input carrier signal of the current stage r(i−1;k) (S121), and then outputs the unmodulated input carrier signal of the current stage r'(i−1;k). The FO estimation circuit 1220 inputs the unmodulated carrier signal of the current stage r'(i−1;k), performs the step of estimating the FO (S122), and outputs the estimated FO Δf'(i). The FO compensation circuit 1230 inputs the input carrier signal of the current stage r(i−1;k), and the estimated FO Δf'(i), performs the step of compensating the frequency of the input carrier signal of the current stage r(i−1;k) for the estimated FO Δf'(i) (S123), and outputs the corrected carrier signal r(i;k) of the current stage.

According to a different embodiment still in reference to FIG. 5, the multi-stage FO estimation and compensation circuit 1000 may inputs an input carrier signal containing an unmodulated portion r'(0;k) instead of the fully modulated input carrier signal r(0;k), and outputs a corrected carrier signal $r_C'(k)$. Accordingly, the primary-level FO estimation and compensation circuit 1200 includes the FO estimation circuit 1220 and the FO compensation circuit 1230 but not the squaring circuit 1210.

Figure 7:
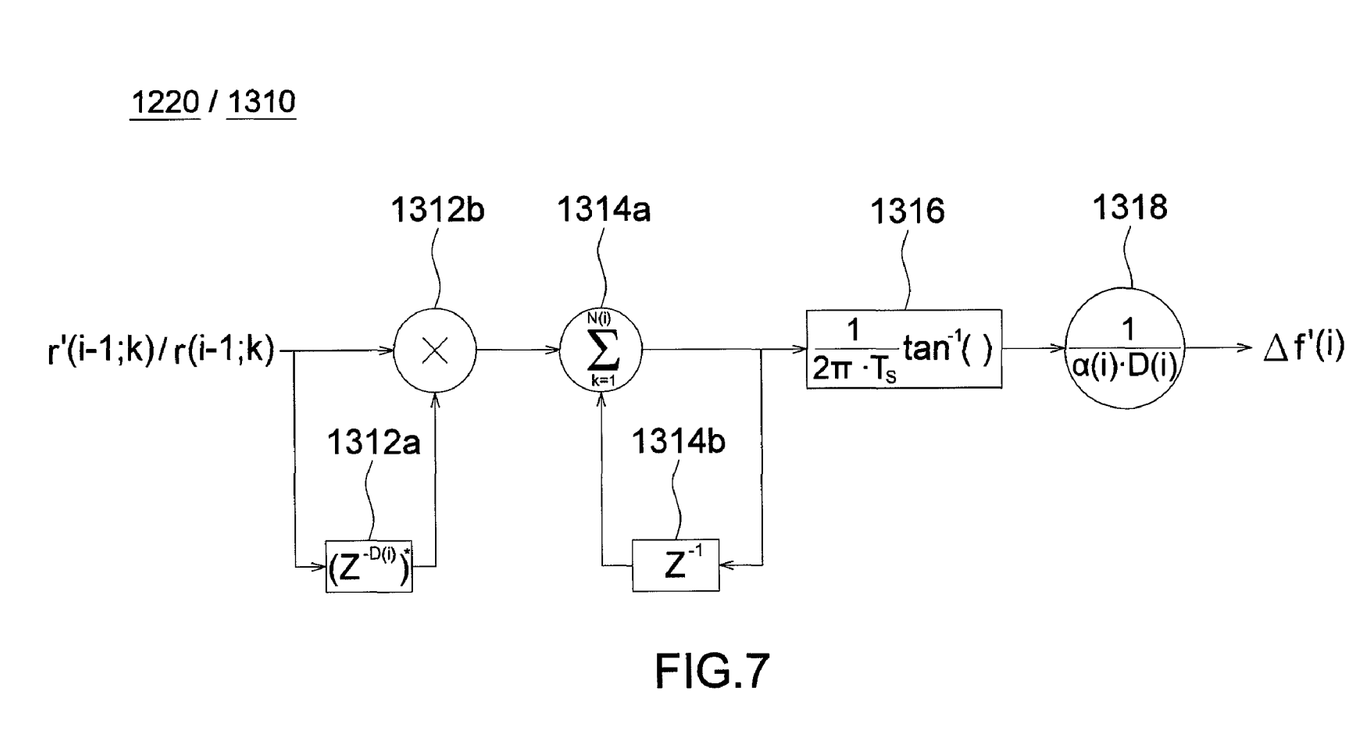
FIG. 7 and FIG. 8 are block diagrams respectively illustrating a frequency offset estimation circuit and a frequency offset compensation circuit according to an embodiment of the present invention.

The FO estimation circuit 1220/1310 according to an embodiment in reference to FIG. 7 inputs the input carrier signal r'(i−1;k)/r(i−1;k) according to the order of the time index, and outputs the estimated FO Δf'(i). The FO estimation circuit 1310 is taken as the example to illustrate the embodiment. The FO estimation circuit 1310 includes a delay buffer and a complex conjugate calculator (denoted together by 1312a), a multiplier 1312b, an accumulator (including 1314a and 1314b, and is referred to as 1314 herein), a phase calculator 1316 and a divider 1318. The delay buffer and the complex conjugate calculator 1312a and the multiplier 1312b perform the step of removing the phase shift θ in the step of estimating the FO of the current stage (S131); the accumulator 1314 performs the step of removing the noise n"(k); and the phase calculator 1316 and the divider 1318 carry out the step of calculating the FO Δf(i).

The delay buffer inputs the input carrier signal of the current time index r(i−1;k) and outputs an input carrier signal r(i−1;k−D(i)) delayed by the time index delay D(i), and the complex conjugate calculator calculates the complex conjugate of the delayed input carrier signal (r(i−1;k−Di)))*. The multiplier 1312b calculates the product r(i−1;k)·(r(i−1;k−Di)))* of the input carrier signal r(i−1;k) and the complex conjugate of the delayed input carrier signal (r(i−1;k−Di)))*. According to a different embodiment, the order of the operations of the delay buffer and the complex conjugate calculator may be reversed.

The accumulator 1314 according to an embodiment includes an adder 1314a and an accumulating buffer 1314b. The adder 1314a adds the product r(i−1;k)·(r(i−1;k−D(i)))* to the value stored in the accumulating buffer 1314b until the number of products accumulated is equal to the number of samples N(i) of the current stage, to output an accumulated sum $$\sum_{k=1}^{N(i)} r(i-1;k) \cdot (r(i-1;k-D(i)))^*.$$

The phase calculator 1316 calculates the tangent of the accumulated sum $$\sum_{k=1}^{N(i)} r(i-1;k) \cdot (r(i-1;k-D(i)))^*$$

and gets an averaged phase difference $$\tan^{-1}\left(\sum_{k=1}^{N(i)} r(i-1;k) \cdot (r(i-1;k-D(i)))^*\right).$$

Besides, according to an embodiment, since the sampling period $T_S$ is predetermined, (i.e. invariant with respect to the stage i), the phase calculator 1316 may further include the operation of dividing the averaged phase difference by $2\pi \cdot T_S$ to obtain a quotient. Then the divider 1318 further divides the quotient by $\alpha(i) \cdot D(i)$, where $\alpha(i)$ is the square adjustment coefficient of the current stage and D(i) is the time index delay of the current stage. Additionally, according to an embodiment, since $\alpha(i) \cdot D(i)$ is a multiple of 2, the divider 1318 may be implemented as a shifter which right shifts the quotient by $\alpha(i) \cdot D(i)$ bits. Of course, a generic divider instead of the shifter may be used perform division for a different embodiment.

Figure 8:
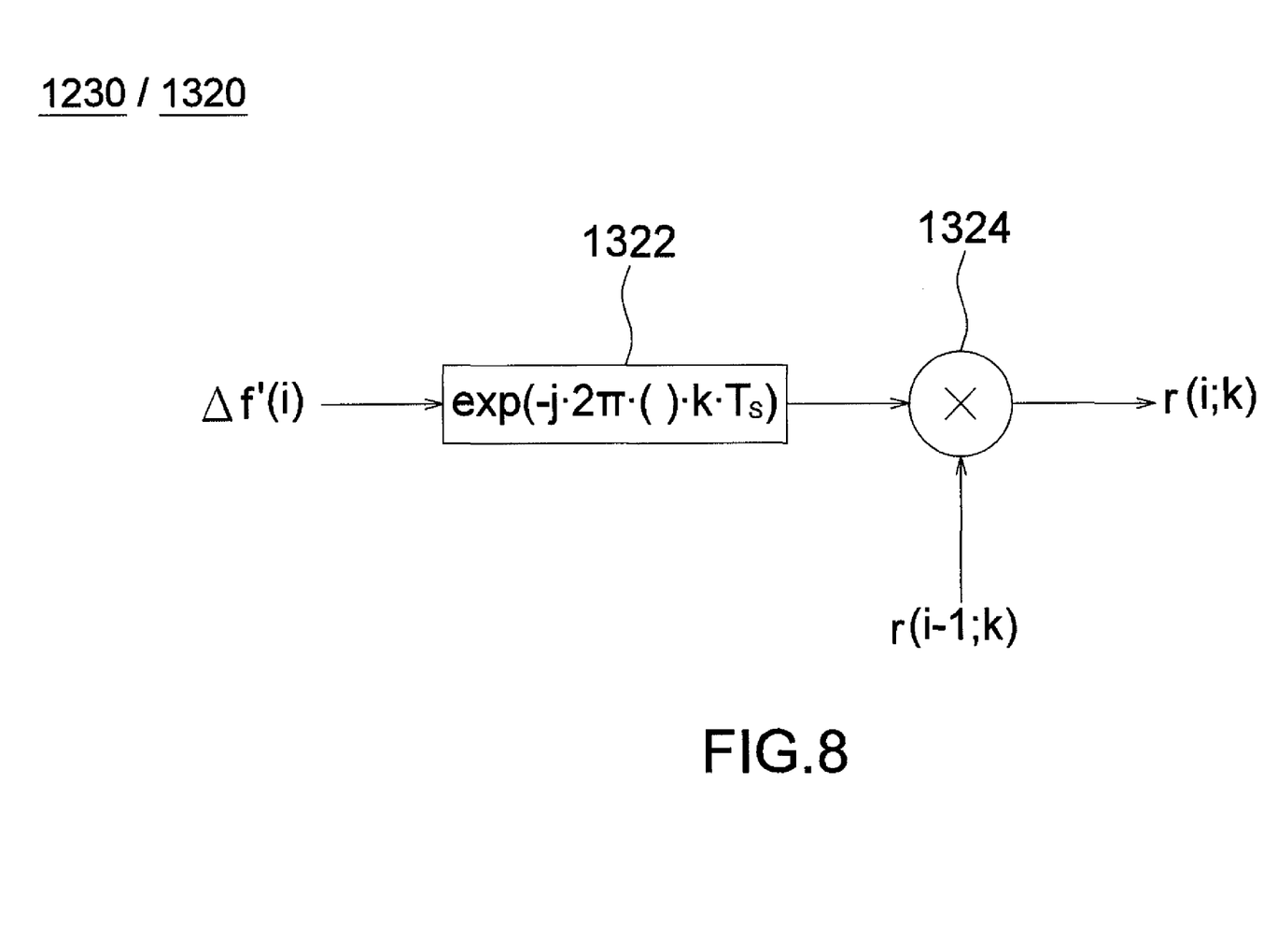

The FO compensation circuit 1230/1320 according to an embodiment in reference to FIG. 8 inputs the input carrier signal of the current stage r(i−1;k) and the estimated FO $\Delta f'(i)$ and outputs the corrected carrier signal of the current stage r(i;k) It includes an oscillator 1322 and a multiplier 1324 wherein the oscillator 1322 generates a compensating signal $\exp(-j \cdot 2\pi \cdot \Delta f'(i) \cdot k \cdot T_S)$ and the multiplier 1324 multiples the compensating signal $\exp(-j \cdot 2\pi \Delta f'(i) - k \cdot T_S)$ with the input carrier signal r(i−1;k) so that the estimated FO $\Delta f'(i)$ is subtracted from the frequency of the input carrier signal of the current stage r(i−1;k) whereby the corrected carrier signal of the current stage r(i;k) is obtained.

Figure 9:
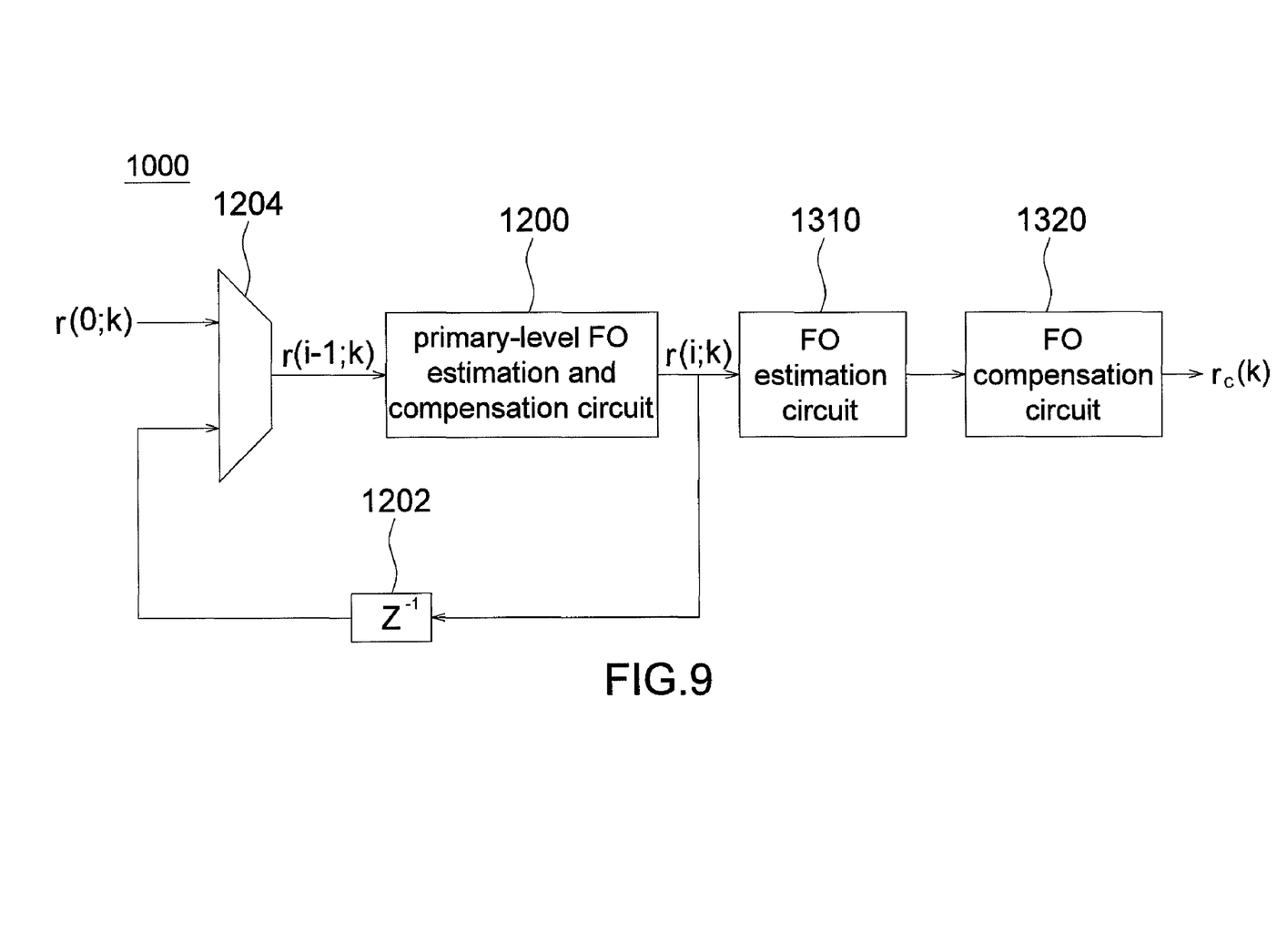
FIG. 9-FIG. 11 are block diagrams illustrating multi-stage frequency offset estimation and compensation circuits according different embodiments of the present invention.

The multi-stage FO estimation and compensation circuit according to an embodiment in reference to FIG. 9 inputs an input carrier signal r(0;k) and outputs a corrected carrier signal $r_C(k)$. The preprocessor circuit includes a primary-level FO estimation and compensation circuit 1200, a feedback delay buffer 1202 and an input selector 1204. The primary-level FO estimation and compensation circuit 1200 performs the primary-level FO estimation and compensation procedure (S12) of each stage. The feedback delay buffer 1202 inputs the corrected carrier signal of the current stage r(i;k), which is delayed (as the stage i increases) and fed back as the corrected carrier signal of the previous stage (i−1). The feedback delay buffer 1202 is optional and may be removed for different implementations. The input selector 1204 selects the input carrier signal of the multi-stage FO estimation and compensation circuit 1000 (i−1=0), or the corrected carrier signal of the previous stage (i−1>0) as the input carrier signal of the current stage r(i−1;k), where the current stage is i=1 or i>1.

Figure 10:
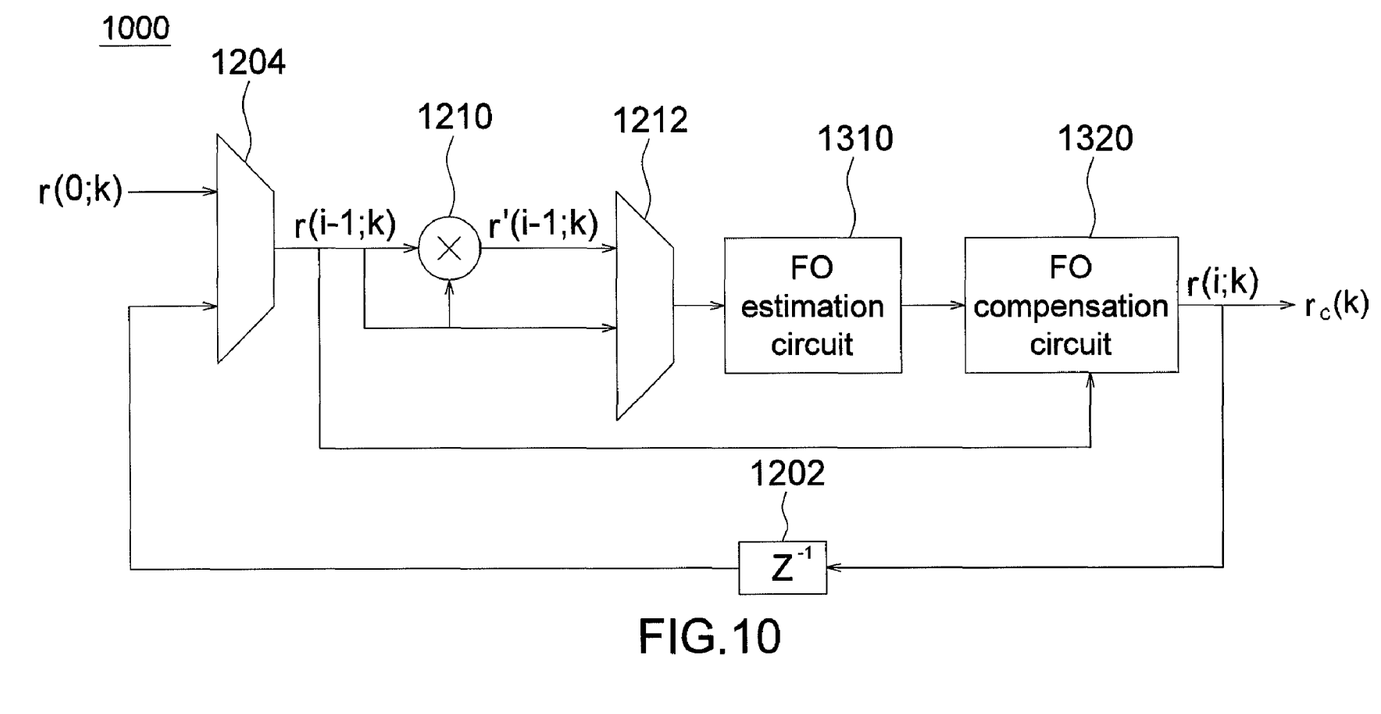

The multi-stage FO estimation and compensation circuit 1000 according to another embodiment in reference to FIG. 10 inputs the input carrier signal r(0;k) and outputs a corrected carrier signal $r_C(k)$. The preprocessor circuit includes: a feedback delay buffer 1202, an input selector 1204, a squaring circuit 1210 and a modulation removing selector 1212. The feedback delay buffer 1202 inputs the corrected carrier signal of the current stage r(i;k), which is delayed (as the stage i increases) and fed back as the corrected carrier signal of the previous stage (i−1). The feedback delay buffer 1202 is optional and may be removed for different implementations. The input selector 1204 selects the input carrier signal of the multi-stage FO estimation and compensation circuit 1000 (i−1=0), or the corrected carrier signal of the previous stage (i−1>0) as the input carrier signal of the current stage r(i−1;k) to be input to the FO compensation circuit 1320, where the current stage is i=1 or i>1. The squaring device 1210 squares the input carrier signal of the current stage r(i−1;k) to obtain an unmodulated input carrier signal of the current stage r'(i−1;k). The modulation removing selector 1212 selects the input carrier signal of the current stage r(i−1;k) or the unmodulated input carrier signal of the current stage r'(i−1;k) as the input to the FO estimation circuit 1310.

Figure 11:
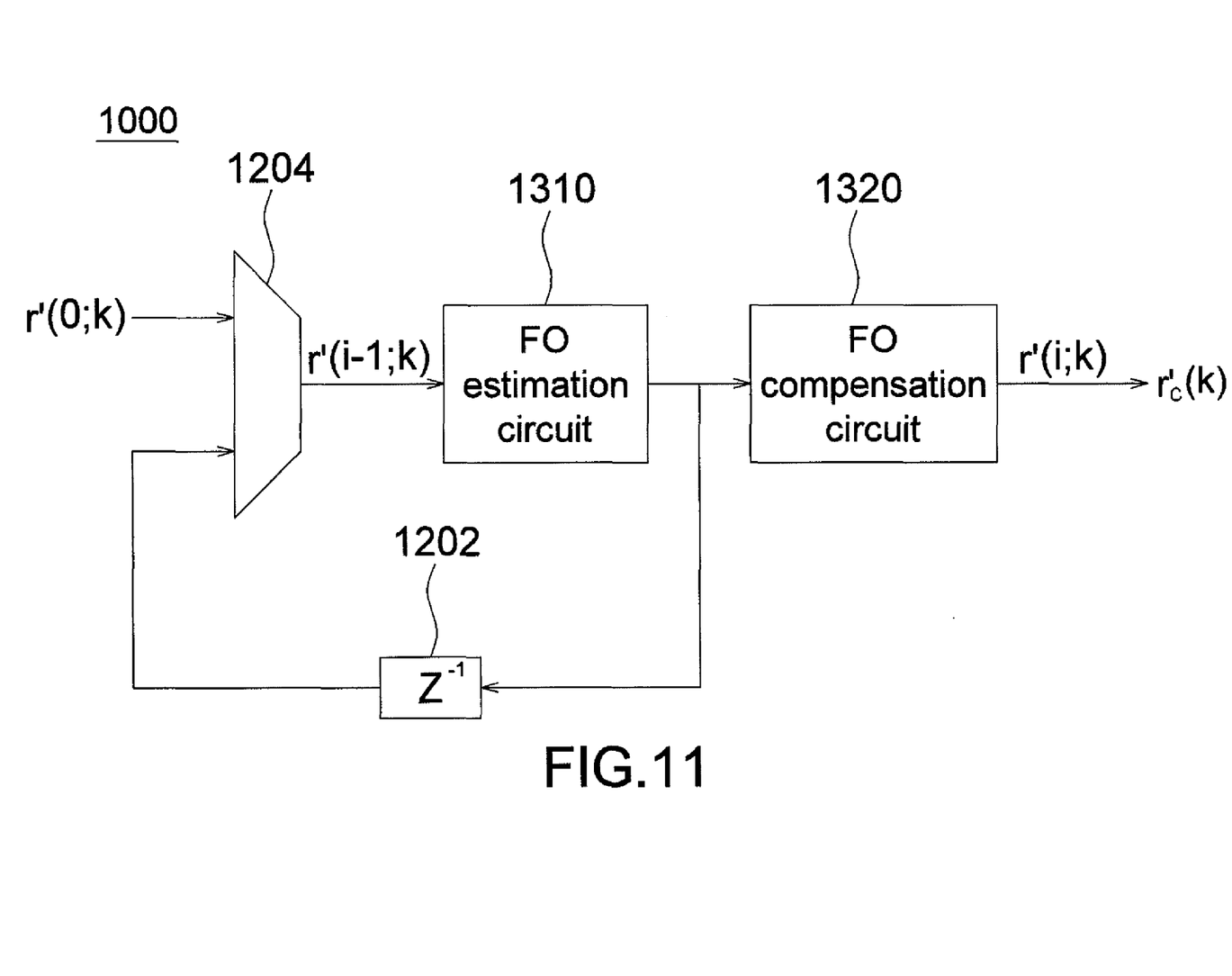

The multi-stage frequency offset and estimation circuit 1000 according to still another embodiment in reference to FIG. 11 inputs an input carrier signal containing an unmodulated portion r'(0;k) and outputs a corrected carrier signal $r_C'(k)$. The preprocessor circuit includes: a feedback delay buffer 1202 and an input selector 1204. The feedback delay buffer 1202 inputs the corrected carrier signal of the current stage r(i;k), which is delayed (as the stage i increases) and fed back as the corrected carrier signal of the previous stage (i−1). The feedback delay buffer 1202 is optional and may be removed for different implementations. The input selector 1204 selects the input carrier signal of the multi-stage FO estimation and compensation circuit 1000 (i−1=0), or the corrected carrier signal of the previous stage (i−1>0) as the input carrier signal of the current stage r'(i−1;k) to be input to the FO estimation circuit 1310 and the FO compensation circuit 1320, where the current stage is i=1 or i>1.

It has to be clarified that the embodiments in reference to FIG. 9, FIG. 10 and FIG. 11 shown above are meant to illustrate some possible ways to share hardware resources. Other possibilities such as partially sharing the primary-level FO estimation and compensation circuit, the FO estimation circuit and the FO compensation circuit are foreseen and should also be included in the scope of the present invention.

While the invention is susceptible to various modifications and alternative forms, a specific example thereof has been shown in the drawings and is herein described in detail. It should be understood, however, that the invention is not to be limited to the particular form disclosed, but to the contrary, the invention is to cover all modifications, equivalents, and alternatives falling within the spirit and scope of the appended claims.

What is claimed is:

1. A multi-stage frequency offset estimation and compensation method comprising:
   providing a binary phase shift keying (BPSK) modulated input carrier signal, which comprises a periodic pseudo-noise (PN) sequence with more than one period of length;
   performing multi-stages of a primary-level frequency offset estimation and compensation procedure to convert a provided input carrier signal fed into a first stage to a last corrected carrier signal out from a last stage of the multi-stages of the primary-level frequency offset estimation and compensation procedure by way of one stage after another wherein when the current stage is the first stage, the provided input carrier signal is set as the input carrier signal of the current stage, whereas when the current stage is beyond the first stage, the corrected carrier signal from the previous stage is fed forward and set as the input carrier signal of the current stage; and
   performing one time an advance-level frequency offset estimation and compensation procedure using the last corrected carrier signal as an input signal; wherein,
   the primary-level frequency offset estimation and compensation procedure comprises:
      estimating a frequency offset of the current stage with an unmodulated portion of the input carrier signal; and
      compensating the frequency of the input carrier signal of the current stage for the estimated frequency offset so as to obtain the corrected carrier signal of the current stage;
   the advance-level frequency offset estimation and compensation procedure comprises:
      estimating the frequency offset of the current stage with periodically repeated chips of the periodic PN sequence; and compensating the frequency of the input carrier signal of the current stage for the estimated frequency offset so as to obtain the corrected carrier signal of the current stage.

2. The multi-stage frequency offset estimation and compensation method according to claim 1, wherein the primary-level frequency offset estimation and compensation procedure further comprises removing the BPSK modulation of the input carrier signal by squaring the input carrier signal of the current stage to provide the unmodulated input carrier signal for estimating the frequency offset.

3. The multi-stage frequency offset estimation and compensation method according to claim 1, wherein the provided input carrier signal contains the unmodulated portion for estimating the frequency offset.

4. The multi-stage frequency offset estimation and compensation method according to claim 1, wherein in the primary-level frequency offset estimation and compensation procedure, the step of estimating the frequency offset comprises:
adjusting a time index delay D(i) of the current stage to be within the range $$1 \le D(i) < \frac{1}{\alpha(i) \cdot T_S \cdot RR(i)},$$

wherein i is the current stage number; $\alpha(i)$ is a square adjustment coefficient of the current stage and is equal to 2 if the input carrier signal has been squared for removing modulation or 1 otherwise, $T_S$ is a preset sampling period, RR(i) is a required estimation range of the current stage, and D(i) is a positive integer;
selecting the number of samples N(i) to be within the range of $1 \le N(i) \le N_{TOTAL} - D(i)$, wherein $N_{TOTAL}$ is the total number of samples, and N(i) is a positive integer; and
calculating $$\Delta f(i) = \frac{1}{\alpha(i) \cdot 2\pi \cdot D(i) \cdot T_S} \tan^{-1}\left(\sum_{k=1}^{N(i)} r'(i-1; k) \cdot (r'(i-1; k-D(i)))^*\right),$$

wherein $\Delta f(i)$ is the frequency offset of the current stage, r'(i−1;k) is the input carrier signal of the current stage containing the unmodulated portion, and k is the time index.

5. The multi-stage frequency offset estimation and compensation method according to claim 4, wherein in the primary-level frequency offset estimation and compensation procedure, the step of estimating the frequency offset further comprises adjusting the time index delay D(i) of the current stage and selecting the number of samples N(i) of the current stage such that a frequency offset estimation error of the current stage err(i;D(i);N(i)) meets the following range:

$$err(i; D(i); N(i)) \le \frac{1}{\alpha(i) \cdot D(i) \cdot T_S} RR(i).$$

6. The multi-stage frequency offset estimation and compensation method according to claim 4, wherein when the current stage for the step of estimating the frequency offset is the first stage, the primary-level frequency offset estimation and compensation procedure further comprises presetting the required estimation range RR(i) as the maximum allowable frequency offset of a communication protocol.

7. The multi-stage frequency offset estimation and compensation method according to claim 4, wherein the current stage for the step of estimating the frequency offset is beyond the first stage, the primary-level frequency offset estimation and compensation procedure further comprises presetting the required estimation range RR(i) as a frequency offset error of the previous stage err(i−1;D(i−1);N(i−1)).

8. The multi-stage frequency offset estimation and compensation method according to claim 1, wherein in the advance-level frequency offset estimation and compensation procedure, the step of estimating the frequency offset comprises:
setting a time index delay D(i) of the current stage as $m \cdot L_{PN}$, wherein m is the reciprocal of the sampling period divided by a chip rate, and $L_{PN}$ is the period of the periodic PN sequence;
selecting the number of samples N(i) to be within the range of $1 \le N(i) \le N_{PN} - D(i)$, wherein $N_{PN}$ is the total number of samples of the periodic PN sequence, and N(i) is a positive integer; and
calculating $$\Delta f(i) = \frac{1}{\alpha(i) \cdot 2\pi \cdot D(i) \cdot T_S} \tan^{-1}\left(\sum_{k=1}^{N(i)} r(i-1; k) \cdot (r(i-1; k-D(i)))^*\right),$$

wherein $\Delta f(i)$ is the frequency offset of the current stage, r(i−1;k) is the input carrier signal of the current stage, $\alpha(i)$ is a square adjustment coefficient of the current stage and is equal to 1, $T_S$ is a preset sampling period, and k is the time index.

9. The multi-stage frequency offset estimation and compensation method according to claim 8, wherein in the advance-level frequency offset estimation and compensation procedure, the step of estimating the frequency offset of the current stage further comprises selecting the number of samples N(i) of the current stage such that a frequency offset error of the current stage err(i;D(i);N(i)) meets the following range:

$$err(i; D(i); N(i)) \le \frac{1}{\alpha(i) \cdot D(i) \cdot T_S} RR(i)$$

wherein RR(i) is a required estimation range of the current stage.

10. The multi-stage frequency offset estimation and compensation method according to claim 9, wherein the advance-level frequency offset estimation and compensation procedure further comprises presetting the required estimation range RR(i) as the frequency offset error of the previous stage err(i−1;D(i−1);N(i−1)).

11. A multi-stage frequency offset estimation and compensation circuit for carrying out the method set forth in claim 1, wherein the multi-stage frequency offset estimation and compensation circuit inputs a provided input carrier signal and outputs a corrected carrier signal and the multi-stage frequency offset estimation and compensation circuit comprises:
a frequency offset estimation circuit for performing including the step of estimating the frequency offset in the advance-level frequency offset estimation and compensation procedure, wherein the frequency offset estimation circuit inputs the input carrier signal of the current stage according to the order of the time index, and outputs an estimated frequency offset, and the frequency offset estimation circuit comprises:
a delay buffer inputting the input carrier signal of the current time index and outputting the input carrier signal delayed by a time index delay D(i) as the delayed input carrier signal, wherein i is the current stage number;

a complex conjugate calculator inputting the delayed input carrier signal and outputting the complex conjugate of the delayed input carrier signal;

a multiplier calculating the product of the input carrier signal of the current time index and the complex conjugate of the delayed input carrier signal;

an accumulator accumulating a number, equal to the number of samples of the current stage, of the products to obtain an accumulated sum;

a phase calculator calculating the tangent of the accumulated sum to obtain an averaged phase difference, and then dividing the averaged phase difference by $2\pi \cdot T_S$ to obtain a quotient, wherein $T_S$ is a sampling period of the input carrier signal;

a divider, further dividing the quotient by $\alpha(i) \cdot D(i)$ to obtain the estimated frequency offset, wherein $\alpha(i)$ is a square adjustment coefficient of the current stage;

a frequency offset compensation circuit for performing including the step of compensating the frequency of the input carrier signal in the advance-level frequency offset estimation and compensation procedure, wherein the frequency offset compensation circuit inputs the input carrier signal of the current stage and the estimated frequency offset to output the corrected carrier signal of the current stage; and a preprocessor circuit for providing the input carrier signal respectively adapted for the frequency offset estimation circuit and the frequency offset compensation circuit.

12. The multi-stage frequency offset estimation and compensation circuit according to claim 11, wherein the preprocessor circuit comprises:

at least one primary-level frequency offset estimation and compensation circuit, wherein each primary-level frequency offset estimation and compensation circuit performs the primary-level frequency offset estimation and compensation procedure for a stage respectively and the primary-level frequency offset estimation circuit inputs the input carrier signal of the current stage and outputs the corrected signal of the current stage, and the primary-level frequency offset estimation circuit comprises:

a squaring circuit squaring the input signal of the current stage to obtain an unmodulated input carrier signal;

another of the frequency offset estimation circuit inputting the unmodulated input carrier signal, and estimating the frequency offset to output the estimated frequency offset; and another of the frequency offset compensation circuit inputting the input carrier signal of the current stage and the estimated frequency offset to output the corrected carrier signal of the current stage.

13. The multi-stage frequency offset estimation and compensation circuit according to claim 11, wherein the provided input carrier signal has an unmodulated portion, and the preprocessor circuit comprises:

at least one primary-level frequency offset estimation and compensation circuit, wherein each primary-level frequency offset estimation and compensation circuit performs the primary-level frequency offset estimation and compensation procedure for a stage respectively, and the primary-level frequency offset estimation circuit inputs the input carrier signal of the current stage and outputs the corrected signal of the current stage, and the primary-level frequency offset estimation circuit comprises:

another of the frequency offset estimation circuit inputting the input carrier signal of the current stage, and estimating the frequency offset to output the estimated frequency offset; and another of the frequency offset compensation circuit inputting the input carrier signal of the current stage and the estimated frequency offset to output the corrected carrier signal of the current stage.

14. The multi-stage frequency offset estimation and compensation circuit according to claim 11, wherein the preprocessor circuit comprises:

a primary-level frequency offset estimation and compensation circuit performing the primary-level frequency offset estimation and compensation procedure for each stage, and the primary-level frequency offset estimation circuit inputs the input carrier signal of the current stage and outputs the corrected signal of the current stage, and the primary-level frequency offset estimation circuit comprises:

a squaring circuit squaring the input signal of the current stage to obtain an unmodulated input carrier signal;

another of the frequency offset estimation circuit inputting the unmodulated input carrier signal of the current stage, and estimating the frequency offset to output the estimated frequency offset; and another of the frequency offset compensation circuit inputting the input carrier signal of the current stage and the estimated frequency offset to output the corrected carrier signal of the current stage;

a feedback delay buffer inputting the corrected carrier signal of the current stage, and providing the feedback corrected carrier signal as the corrected carrier signal of the previous stage; and an input selector for selecting the provided input carrier signal or the corrected carrier signal of the previous stage as the input carrier signal of the current stage.

15. The multi-stage frequency offset estimation and compensation circuit according to claim 11, wherein the frequency offset estimation circuit and the frequency offset compensation circuit are also for performing the primary-level frequency offset estimation and compensation procedure.

16. The multi-stage frequency offset estimation and compensation circuit according to claim 15, wherein the preprocessor circuit comprises:

an optional feedback delay buffer inputting the corrected carrier signal of the current stage, and providing the feedback corrected carrier signal as the corrected carrier signal of the previous stage;

an input selector for selecting the provided input carrier signal or the corrected carrier signal of the previous stage as the input carrier signal of the current stage to input to the frequency offset compensation circuit;

a squaring circuit squaring the input carrier signal of the current stage to obtain an unmodulated input carrier signal; and a modulation removing selector for selecting the input carrier signal of the current stage or the unmodulated input carrier signal to input to the frequency offset estimation circuit.

17. The multi-stage frequency offset estimation and compensation circuit according to claim 15, wherein the provided input carrier signal contains an unmodulated portion, and the preprocessor circuit comprises:

an optional feedback delay buffer inputting the corrected carrier signal of the current stage, and providing the feedback corrected carrier signal as the corrected carrier signal of the previous stage; and an input selector for selecting the provided input carrier signal or the corrected carrier signal of the previous stage as the input carrier signal of the current stage to be input to the frequency offset estimation circuit and the frequency offset compensation circuit.

* * * * *